United States Patent [19]
Byrne

[11] Patent Number: 5,396,731
[45] Date of Patent: Mar. 14, 1995

[54] MULCH PADS AND METHODS

[76] Inventor: Steven E. Byrne, 10787 Big Bone Church Rd., Union, Ky. 41091

[21] Appl. No.: 249

[22] Filed: Jan. 4, 1993

Related U.S. Application Data

[63] Continuation of Ser. No. 489,683, Mar. 7, 1990.

[51] Int. Cl.⁶ .............................................. A01G 17/00
[52] U.S. Cl. ................................................ 47/25; 47/9
[58] Field of Search ...................... 47/9, 24, 25, 32, 33, 47/28.1

[56] References Cited

FOREIGN PATENT DOCUMENTS

| | | | |
|---|---|---|---|
| 2521881 | 11/1976 | Germany | 47/32 |
| 2752831 | 5/1979 | Germany | 47/32 |

Primary Examiner—Ramon S. Britts
Assistant Examiner—Joanne C. Downs
Attorney, Agent, or Firm—Wood, Herron & Evans

[57] ABSTRACT

A mulch pad in preformed or pourable state comprises a mixture of rubber granules, buffings, and fibers ground from used tires, a curable binder and coloring, catalyst and anti-gloss agents. Also, a U.V. light stabilizer and anti-oxidants can be added to the mixture. A preformed pad has a central trunk receiving aperture and a partially pre-cut, relockable slit which can be torn and then rejoined for disposition of the pad around a tree. The pad is porous and prevents moisture and air transmission to underlying root system while insulating them.

17 Claims, 1 Drawing Sheet

MULCH PADS AND METHODS

This is a continuation of application Ser. No. 07/489,683, filed Mar. 7, 1990.

FIELD OF THE INVENTION

This invention relates to the protection of trees and plants and more particularly to mulching systems for protecting trees and plants and their root systems.

BACKGROUND OF THE INVENTION

The state of manicuring and trimming around trees, plants and other grounds has significantly changed over the last ten to fifteen years. The advent of low cost, lightweight flexible line trimmers, both gas and electric powered, has made it possible for many property owners to acquire an effective trimming tool. Yet, in the hands of an unskilled or unknowledgeable person, use of these same effective tools can have disastrous results, killing plants and trees, and damaging other objects where trimming is attempted. For example, when trimming around trees, it is easy to get too close and contact the trunk with the flailing line. This destroys the bark, and may even girdle the tree, killing it.

Trimming too closely to other objects, such as siding, posts, grave markers and the like can also damage them. Mowing too closely to trees and plants also may harm them, particularly when the mower strikes a tree, for example, and destroys its bark.

In order to beautify grounds, natural mulching systems, such as natural bark, wood products, peat, etc. have been used to mulch around trees, plants and other items. These inhibit weed and grass growth and present a manicured appearance, but require continual care and replenishment. The initial preparation and continuing care are expensive and many trees go initially unprotected, or the mulch is not maintained, either situation leaving them subject to trimming or mowing damage when grass or weeds grow near them.

In considering use of mulching systems particularly around trees and plants, it is thus important to inhibit near weed and grass growth to eliminate the need for close-in trimming and mowing, but at the same time to protect and accommodate the underlying root system, and to present a desired aesthetic appearance. It does little good to inhibit grass and weed growth with a mulch system which has a damaging effect on the underlying root system, killing the very tree it is designed to protect. Mulch systems which fail to transmit air and water to such root systems, or which act to draw water away from such systems, do more harm than good.

Natural mulching systems having numerous advantages and have been used for some time; they usually provide a highly desirable, natural appearance. Nevertheless, they also present several inherent drawbacks including the aforementioned expense and maintenance requirements. For example, they must be periodically replenished due to both natural and mechanical degradation. For example, hard rains, winds and even watering may flush away the mulch, leaving the ground and root system thereunder subject to erosion from water force and other environmental conditions.

Certain natural mulch systems may also tend to hold water themselves, not passing it to the underlying roots, or actually draining it away from the roots by capillary action.

It has thus been one objective of this invention to provide improved mulching systems and components.

A further objective has been to provide a mulch system having a natural mulching appearance and preventing weed and grass growth around trees while passing moisture and air through to the root system, and insulating such root system.

To these ends, the invention contemplates the combination of a waste product with other components in a mulching system for satisfying these objectives while at the same time providing a waste product usage having a significant beneficial impact on our existing environment.

More particularly, in a preferred embodiment of the invention, rubber and fibers are ground from used automobile tires, and are combined with a curable binder to form a matrix defining a moisture and air porous, weed and grass-growth preventive pad. An aperture is disposed in the center of the pad to accommodate a tree trunk, and a slit is preferably partially formed or cut from a circumference of the pad to the aperture.

In use, the pad is torn along the partially cut slit to provide a jagged seam so that the pad can be disposed around a tree trunk. Thereafter, the jagged, seam edges are rejoined to provide a trunk-surrounding pad, and the seam is virtually, if not totally, obscured, all to provide a naturally mulched appearance.

In another embodiment of the invention, a curable, liquid binder is mixed with the rubber granules and fibers. This mix is packaged in containers from which the mulch can be poured in place. Upon curing, a porous weed and grass growth preventing pad is formed in place. Such pourable mulch system can be used alone, or small packets thereof used with the first embodiment of a cured pad to fill in around the center trunk hole, or to adhere the slit or seam.

In producing functionally useful pads, it is also desirable that they have a natural aesthetic appearance, as if the pad was indigenous organic mulch. But rubber tire particles are coal black, while the binder coating them is clear, or may be yellowish in appearance. Frequently, such binder/granule mix, when cured, may have an undesirable color and/or sheen or gloss.

It has thus also been an objective of this invention to provide a mulch system from ground, waste rubber and a binder, and means for controlling the appearance of the cured mulch mat to provide desirable color and aesthetics.

To this end, in making pads of the preferred embodiment, a binder comprising urethane is used, and is mixed together with pigment to provide a desirable color. This is preferably mixed with a catalyst to promote curing and the ground rubber and fibers are mixed therein. This mixture is then molded into a desired shape and a diatomaceous earth or silica is sprinkled over the uncured mixture to produce a desirable anti-gloss effect in the cured pad so produced.

The mulching system provided by the invention provides numerous advantages. When used around a tree, it prevents grass and weed growth around the trunk, thus making it unnecessary to trim or mow closely thereto. At the same time, it provides a relatively inexpensive, natural appearing mulch system with little, if any, continuing maintenance needed. At the same time, the mulch system is porous, transmitting moisture and air to the root system, both facilitating its nourishment and insulating it.

While the pad transmits air and moisture, its voids, between the bound rubber granules and fibers, do not operate as capillaries, pulling water away from the root system. Instead, the pad insulates the root system and retains water and-condensate beneath the pad for benefit of the root system.

It will also be appreciated that the pad provides erosion protection for the underlying soil and root system. For example, even a high velocity stream of water directed against the pad will, by the time the water travels through the pad, be broken down into low velocity droplets. This serves to disperse fluid energy, and prevents soil erosion while the pad does not mechanically degenerate and remains in place, reducing maintenance concerns. Not only does the pad transform high velocity water streams into a plurality of dispersed water droplets, but it will be appreciated that the pad disperses the water laterally through the pad for greater overall moisture coverage.

Accordingly, pads or mats of the composition according to the invention can be used over ground to prevent erosion, such as on hillsides, under downspouts, in walk areas, steps and the like.

These and other objectives and advantages will become readily apparent from the following detailed description of a preferred embodiment of the invention, and from the drawings in which:

DETAILED DESCRIPTION OF THE INVENTION

Figure 1:
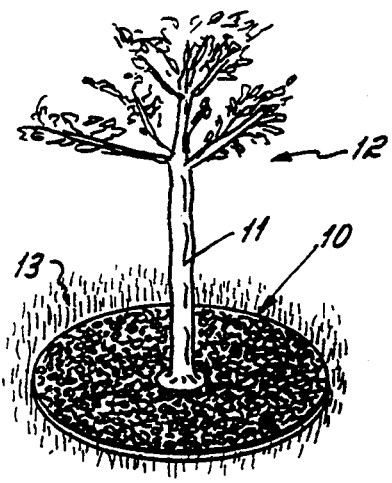
FIG. 1 is a perspective illustration showing a preferred embodiment of the invention in use.

Turning now to the drawings there is shown in FIG. 1 a preferred embodiment 10 of the porous mulch pad or mat of the invention in place at ground level around the trunk 11 of tree 12. Grass 13 grows around the pad 10, but not through it.

Figure 2:
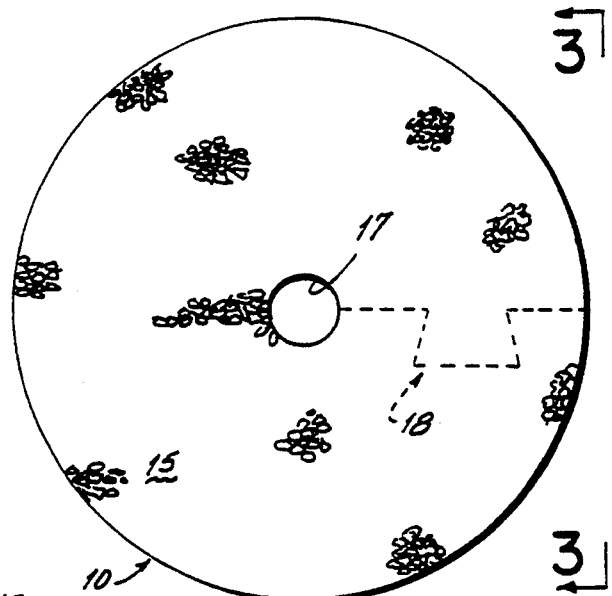
FIG. 2 is a top plan view of a preferred embodiment of the invention as in FIG. 1.
Figure 3:
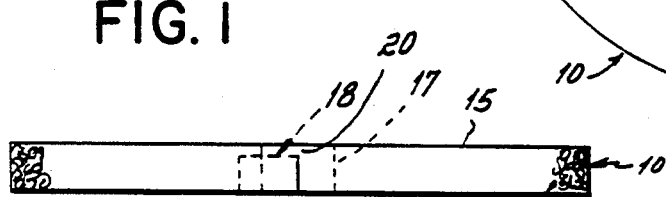
FIG. 3 is a side view of the mulch pad taken along lines 3—3 of FIG. 2.
Figure 4:
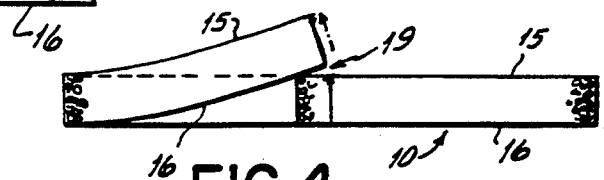
FIG. 4 is a view similar to FIG. 3 but showing the tearing of the pad of the invention for disposition about a tree.

As best seen in FIGS. 2 and 3, pad 10 has an upper surface 15 and lower surface 16 for ground engagement. A trunk receiving aperture 17 is disposed in the center or intermediate area of pad 10. As shown, the pad is preferably circular in nature but could be formed or cut into any suitable or desired shape.

A partially precut or preformed slit 18 is cut from the bottom surface 16 of pad 10 by any suitable means such as a heated wire cutter so that the slit stops short of surface 15, leaving uncut areas 20. The upper surface 15 in the finished pad thus appears to be continuous.

Figure 5:
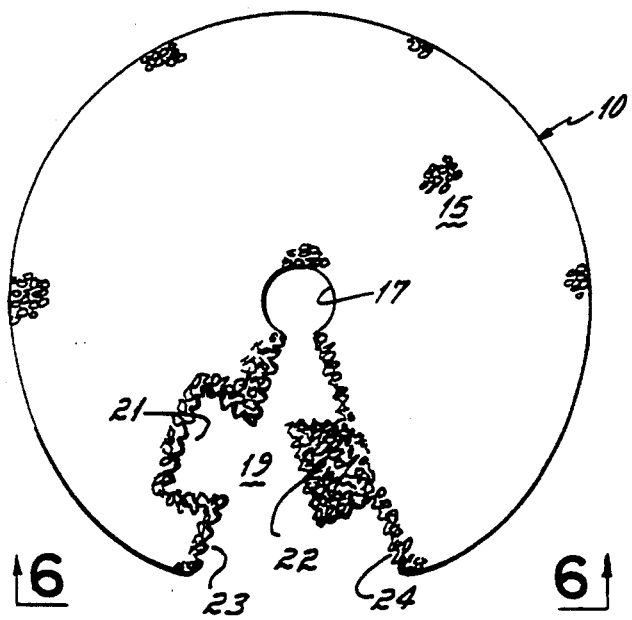
FIG. 5 is a view similar to FIG. 2 but showing the pad of the invention in FIGS. 1-3 split for disposition around a tree.

Preformed slit 18 has a tortuous or serpentine shape (FIGS. 2, 3, 5). In use, the uncut portion 20 of the pad, along and in the direction of slit 18, is torn manually when the pad is to be disposed about a tree. This is illustrated in FIG. 5 where the tearing produces a split or seam 19 in the pad. The seam is relockable by virtue, for example, of cooperating dove-tail shaped opening 21 and lug 22 (FIG. 5).

Figure 6:
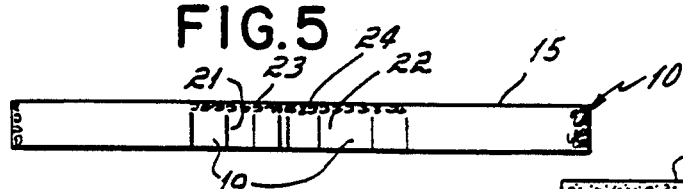
FIG. 6 is a side view taken along lines 6—6 of FIG. 5.

Once slit 18 is fully torn, the pad 10 can be separated for disposition about a tree. Thereafter, the seam edges are rejoined. The uneven tearing of the mat portion 20 along slit 18 produces upper jagged seam edges 23 and 24, for example (FIGS. 5 and 6). These jagged edges are joined and locked together so that ultimate visual result is that of a continuous natural surface 15, even after disposition of the pad around a tree. This provides a more natural or more obscurable joint than if the entire slit was pre-cut.

The pad is preferably made from rubber granules ground from used tires. The granules are generally in the range of about ¼ inch to about ¾ inch in major dimension. When used tires are ground, steel components are removed, leaving the rubber granules, some rubber powder or "buffings" and, if rayon, nylon or other such materials were used in the tires, discrete fibers of same, about one inch or less in length. All such products, granules, buffings, and fibers may be used in the pad mixture to facilitate providing a natural mulch pad in appearance.

These materials were mixed with an appropriate, curable binder such as a latex or urethane binder. Where the pads are pre-formed, one suitable binder has been determined to be moisture curable, polyurethane, #2040, manufactured by the ICI Polyurethane division of ICI Americas Inc.

The general range of ratios of materials from used tires to binder, by weight is from about 9 or 10 to about 4 or 5 to 1 with the preferable ratio being about 8 to 1. The voids to solids volumetric weight ratio is about 1 to 1.

The final pad is desired to appear mulch-like. Accordingly, color and sheen are controlled. A coloring agent of iron oxide pigment, No. 4701, manufactured by PDI of ICI Americas, Inc., or any other suitable pigment is used. To control sheen or gloss for a more natural-like appearance, an anti-gloss agent of diatomaceous silica, such as celite #499 manufactured by Manville Filtration and Minerals is used. This is sprinkled on the surface of the uncured, molded pad mixture and provides an anti-gloss effect.

Finally, as needed, an appropriate catalyst such as Dabco No. T-12 manufactured by Air Products and Chemicals Company is used. Any suitable pigment and anti-gloss additives may be used.

In one preferred embodiment, the final mixture by weight comprises:

about 87 to 89% rubber granules and buffings;

about 0 to 2% fiber;

about 11% binder;

about 2 to 5% coloring agent by weight of total binder;

about 0.01 to 0.03% catalyst by weight of total binder; and about negligible percent U.V. light stabilizers and anti-oxidants.

Such a pad mixture, when cured, weighs about 0.65 grams per cubic centimeter, and has a solids to voids volumetric ratio of about 1 to 1. Of course, this ratio can be adjusted by varying the particle sizes of the ground rubber from trees. For example, an increase in particle size will generally provide more air volume while a decrease in particle size will generally provide less air volume.

In one preferred pad, the pad is about 21 inches in diameter, 1 inch thick and has a 2 inch central, trunk receiving aperture 17.

In another embodiment, where the mulch pad is not pre-formed but is wholly poured in place, essentially the same components, without catalyst, are used. Thus in this pourable embodiment, one suitable mixture comprises, by weight:

about 78 to 90% rubber granules and buffings;
about 0 to 2% fiber;
about 10 to 20% binder;
about 2 to 5% coloring agent; and
0% catalyst.

This material is packaged in a storage container from where it can be poured around the tree, cemetery monument, etc. where a mulch pad is desired or used. Air is evacuated from the package and nitrogen introduced by any suitable means to avoid curing before the package is opened.

Figure 7:
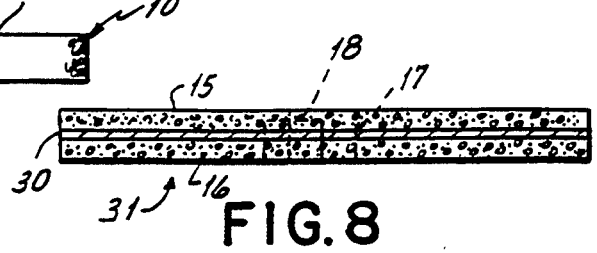
FIG. 7 is a perspective view illustrating one use of another embodiment of the invention.

A flexible barrier or mold 26 (FIG. 7) may be disposed in any desired shape and is preferably used to mold or contain the poured mix. Other means to contain the mix, until cured, can be used. After pouring, the mixture cures into a mulch pad with the same attributes as the preformed pad described above. After pouring, and if desired, an antigloss agent as described above, can be used.

In addition, such a pourable material can be poured between a tree trunk, monument, etc., and a pre-formed pad, to seal the area between pad 10 and trunk 11 (see FIG. 1) to keep grass and weeds from growing therebetween.

Figure 8:
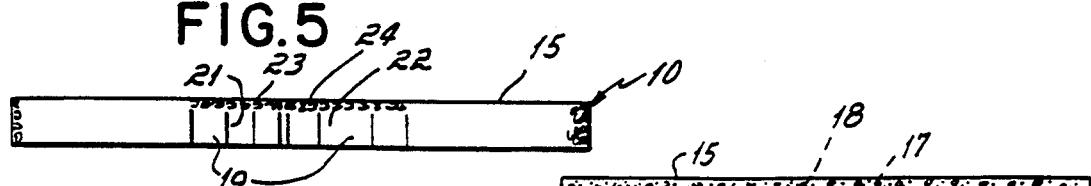
FIG. 8 illustrates another alternative embodiment of the invention.

In another embodiment, significantly larger pads than 21 inches in diameter are provided. The cured pads described above are relatively heavy. Larger pads, when handled by hand, are difficult to maneuver and their weight makes them more difficult to handle, and causes them to more easily tear, in undesirable areas. To prevent undesirable tearing, the pads can be made thicker, increasing their weight, or denser, decreasing their void to solid ratio. Neither is desirable. In order to provide larger pads, another embodiment of the invention contemplates the use of an internal mesh layer of fiberglass, nylon, polyethylene, or the like disposed centrally in the pad for strength. Such is illustrated in FIG. 8 as mesh layer 30 in pad 31. Such a pad is made identically to pad 10 except when molded a first layer of mixture is deposited, the mesh 30 laid on this, and a second layer of mixture is placed on the mesh. This is then cured together and the slit 18 is either formed or pre-cut through the mesh. Mesh 30 is any suitable reinforcing mesh. Woven or non-woven materials can be used.

Moreover, it will be appreciated that the mesh material may be selected from materials which either bond or do not bond with the urethane binder. Where the mesh does bond with the urethane, the resulting mat has great resistance to tearing and internal flow of binder and particles due to environmental or situational stresses. On the other hand, mesh materials which do not bond with the binder still offer a degree of tear resistance but also permit the mat to more easily seek a configuration conforming to the underlying surface, and particularly as a result of environmental or situational stresses. Where the binder does not permanently bond with the mesh, binder coated rubber particles may extend through the mesh, thus helping to hold the pad together, yet with a lessened degree of resistance to conformation with underlying surfaces.

As a result, use of the reinforcing mesh provides larger pads such as in four foot wide sheets and rolls. The pads can be made much thinner, yet resistant to undesirable tearing.

It will be appreciated that preformed pads, according hereto, of any shape, or pourable pads, may be used in many environments around trees, plants, monuments, walks, steep banks for erosion control, etc. where mulching is desired. The pads prevent weed and grass growth, while passing moisture and air to underlying root systems. At the same time, the pads insulate the underlying root systems.

Growth of weeds and grass adjacent trees and plants is eliminated, thus eliminating potentially killing damage or close mowing or trimming to plants and trees.

The composition of the pad as described provides a highly textured, non-uniform surface (see the detail in FIG. 2) which approximates the look of natural bark mulch, for example.

Moreover, use of products, such as rubber granules, buffings and fibers from used tires helps solve a severe environmental waste disposal problem by recycling into a useful product (in potentially large enough volume to have a significant impact) an otherwise problematic waste product.

These and other advantages and modifications will be readily apparent to those of ordinary skill in the art and applicant intends to be bound only by the claims appended hereto.

I claim:

1. A flexible mulch pad for use around trees, plants, or other objects, comprising:

a plurality of rubber granules;
a binder holding said granules together in the form of a mat;
said pad being porous to moisture and air but preventing growth of grass and weeds therethrough; and
coloring means combined with at least one of the other components of said pad;
whereby said pad has a color and texture presenting a natural bark mulch appearance;
said pad having a peripheral edge and an intermediate aperture therein, and a partially preformed slit means extending from said peripheral edge to said aperture;
an uncut portion of said pad proximate said slit means being tearable in a direction along the slit means to provide a seam for disposition of said pad around a tree, plant or object;
wherein the pad has an upper surface and a lower surface for contacting the ground around an object, said partially preformed slit means being partially cut into said pad from said lower surface, said upper surface being continuous until said pad is torn in a direction along said slit means.

2. A flexible mulch pad as in claim 1 including fibers from used rubber tires.

3. A flexible mulch pad as in claim 1 wherein said pad has a circular peripheral edge, and is about 21 inches in diameter, said pad being one inch thick along said peripheral edge.

4. A flexible mulch pad as in claim 1, wherein said seam is defined by jagged edges in said upper pad surface, said jagged edges being rejoinable to form a continuous upper surface in said pad.

5. A mulch pad as in claim 1 wherein said slit means is non-linear from the peripheral edge of the pad to said aperture.

6. A mulch pad as in claim 5 wherein said seam defines tortuous, relockable edges for rejoining after said pad is torn.

7. A mulch pad as in claim 1 wherein said pad has a solid to void ratio of from about 1 to 1.

8. A mulch pad as in claim 1 wherein said pad weighs about 0.65 grams per cubic centimeter.

9. A mulch pad as in claim 1 wherein said binder comprises moisture curable urethane.

10. A mulch pad as in claim 1 also including a coloring pigment; a curing catalyst and diatomaceous silica on a surface thereof as an anti-gloss agent.

11. A mulch pad as in claim 10 comprising, by weight, approximately
about 80% to 90% in rubber granules and buffings and 10% to 20% in binder.

12. A mulch pad as in claim 11 further comprising by weight of binder mixture approximately:
about 2% to 5% in coloring; and
about 0.01% to 0.03% in catalyst.

13. A flexible mulch pad as in claim 1 wherein said rubber granules comprise by weight of said pad up to about 89% and said binder comprises by weight up to about 13%.

14. A flexible mulch pad as in claim 13 further comprising by weight up to about 2% fiber.

15. A flexible mulch pad as in claim 14 comprising by weight up to about 5% coloring agent.

16. A flexible mulch pad as in claim 15 further comprising diatomaceous silica on one surface thereof.

17. A flexible mulch pad for use around trees, plants, or other objects, comprising:
a plurality of rubber granules;
a plurality of buffings;
a binder holding said granules together in the form of a mat;
said pad being porous to moisture and air but preventing growth of grass and weeds therethrough;
a slit partially cut into said pad from an underside thereof and extending from a peripheral edge toward a center thereof, said pad being tearable along said slit to separate said pad for placement about a plant;
said pad having jagged edges along said slit when torn, said edges being rejoinable;
coloring means combined with at least one of the other components of said pad;
whereby said pad has a color and texture presenting a natural bark mulch appearance.

* * * * *